US011808300B2

(12) United States Patent
Davis

(10) Patent No.: US 11,808,300 B2
(45) Date of Patent: Nov. 7, 2023

(54) DEVICE FOR STABILIZING THE PRESSURE INSIDE A GEARS HOUSING OR BETWEEN A WHEELS HUB AND THE AXLE ITS MOUNTED TO AND RELATED SYSTEMS AND METHODS

(71) Applicant: Lew Davis, Wenatchee, WA (US)

(72) Inventor: Lew Davis, Wenatchee, WA (US)

(*) Notice: Subject to any disclaimer, the term of this patent is extended or adjusted under 35 U.S.C. 154(b) by 892 days.

(21) Appl. No.: 16/648,909

(22) PCT Filed: Sep. 27, 2018

(86) PCT No.: PCT/US2018/053093
§ 371 (c)(1),
(2) Date: Mar. 19, 2020

(87) PCT Pub. No.: WO2019/067701
PCT Pub. Date: Apr. 4, 2019

(65) Prior Publication Data
US 2020/0248745 A1 Aug. 6, 2020

Related U.S. Application Data

(60) Provisional application No. 62/564,813, filed on Sep. 28, 2017.

(51) Int. Cl.
*F16C 19/38* (2006.01)
*B60B 27/00* (2006.01)
(Continued)

(52) U.S. Cl.
CPC .......... *F16C 19/386* (2013.01); *B60B 27/001* (2013.01); *B63H 20/002* (2013.01);
(Continued)

(58) Field of Classification Search
CPC ... B63H 20/002; F16N 17/00; F16N 2270/60; F16N 2270/48; B60B 2900/511; B60B 2900/5118; B60B 2900/561
See application file for complete search history.

(56) References Cited

U.S. PATENT DOCUMENTS 2,611,668 A * 9/1952 Douglass ................ B60B 37/10
384/471
4,172,620 A * 10/1979 Marti .................... F16C 33/723
384/474
(Continued)

*Primary Examiner* — Michael A Riegelman
(74) *Attorney, Agent, or Firm* — Janeway Patent Law PLLC; John Janeway

(57) ABSTRACT

A device for stabilizing pressure inside a gear's housing or a wheel's hub includes a bladder, and a conduit coupled to the bladder and coupleable to a volume containing a lubricant. The bladder includes a chamber having a volume, and is configured such that the chamber's volume increases as a fluid enters the chamber, and decreases as fluid leaves the chamber. The conduit includes a first end positionable adjacent the lubricant containing volume, a second end coupled with the bladder, and a passage between the first and second ends, and is configured to hold fluid disposed in the passage and direct the fluid between the first and second ends. When the conduit is coupled to the lubricant containing volume, the volume of the bladder's chamber, the passage of the conduit and the lubricant containing volume are isolated from the ambient environment.

23 Claims, 3 Drawing Sheets

(51) Int. Cl.
    *B63H 20/00*   (2006.01)
    *F16N 17/00*   (2006.01)
    *B60B 27/02*   (2006.01)
    *F16C 33/66*   (2006.01)

(52) U.S. Cl.
    CPC .......... *F16N 17/00* (2013.01); *B60B 27/0073* (2013.01); *B60B 27/02* (2013.01); *B60B 2380/14* (2013.01); *B60B 2900/511* (2013.01); *B60B 2900/5118* (2013.01); *B60B 2900/561* (2013.01); *F16C 33/667* (2013.01); *F16C 2326/02* (2013.01); *F16C 2326/30* (2013.01); *F16N 2270/48* (2013.01); *F16N 2270/60* (2013.01)

(56) References Cited

U.S. PATENT DOCUMENTS

| | | | | |
|---|---|---|---|---|
| 5,098,168 A | * | 3/1992 | Johnson | B60B 27/0073 301/124.1 |
| 5,551,530 A | * | 9/1996 | Goettker | F16C 33/6637 184/45.1 |
| 6,325,463 B1 | * | 12/2001 | Sitter | B60B 27/0005 301/124.1 |
| 6,375,047 B1 | * | 4/2002 | Herda | B67D 7/0227 222/394 |
| 6,820,724 B2 | * | 11/2004 | Sekine | F16C 33/6625 184/7.4 |
| 7,226,133 B2 | * | 6/2007 | Dombroski | F16C 33/76 384/489 |
| 8,075,357 B2 | * | 12/2011 | Fukuoka | B63H 20/002 440/88 L |
| 2006/0231336 A1 | * | 10/2006 | Crawford | F16C 33/6651 184/5.1 |
| 2009/0181585 A1 | * | 7/2009 | Fukuoka | B63H 20/002 440/88 L |
| 2020/0248745 A1 | * | 8/2020 | Davis | F16C 33/6677 |
| 2023/0119447 A1 | * | 4/2023 | Kekki | F16N 21/00 277/549 |

* cited by examiner

DEVICE FOR STABILIZING THE PRESSURE INSIDE A GEARS HOUSING OR BETWEEN A WHEELS HUB AND THE AXLE ITS MOUNTED TO AND RELATED SYSTEMS AND METHODS

BACKGROUND

Many mechanisms for transmitting power experience rapid changes in environmental conditions. For example, the gears in an outdrive gearcase of a sterndrive boat motor generate a lot of heat while rotating a propeller in water. While the boat is planning on the water the gears in the outdrive gearcase are located above the water, in the air. But while the boat is traveling at a wakeless speed or the motor is off, the gears in the outdrive gearcase lie below the water line. Because the gears generate a lot of heat while they are in relatively warm air, the gears run hot. And when the gears lie below the water line the relatively cold water causes the gears to cool quickly. For another example a hub for a boat trailer experiences rapid changes in environmental conditions when the wheel of the trailer is submerged in water during the launch of a boat. While the trailer hauls the boat to the launch, the wheel's hub generate heat as the wheel rotates about the trailer's axle. If the distance to the launch is many miles, the wheel's hub can get quite hot. Then when the wheel's hub is submerged in cold water during the boat's launch, the wheel's hub cools quickly.

These rapid changes in environmental conditions can cause damage to these mechanisms. The heat generated in the outdrive gearcase and a wheel's hub causes gas in the outdrive gearcase and in the wheel's hub to expand. This expansion in a closed space generates pressure in the outdrive gearcase and wheel's hub that is greater than pressure in the ambient environment. This, in turn, can cause the expulsion of lubricant from the lubricant-containing volume surrounding the gears of the outdrive gearcase and between the bearings in the wheel's hub. The regular expulsion of lubricant from the outdrive gearcase and wheel's hub requires more lubricant to be periodically added, which is a labor-intensive process. If additional lubricant is not added, serious damage can eventually occur. Also, forcible expulsion of the lubricant due to the buildup of positive pressure can damage seals, resulting in progressively more lubricant being expelled and potential intrusion of unwanted elements through the damaged seals into the outdrive gearcase and wheel's hub. Intrusion of unwanted elements into an outdrive gearcase's housing and wheel's hub can also damage the hub, bearings, and seals.

Likewise, the rapid cooling of the gears in an outdrive gearcase and a wheel's hub causes the gasses in the housing and hub to contract. This contraction in a closed space generates pressure in the outdrive gearcase and wheel's hub that is less than the pressure in the ambient environment. This, in turn, can cause water and debris to be drawn into the gearcase and hub. Water and debris may interfere with the lubricant properties and cause friction and rust. Overtime, this unwanted friction can damage the gears in the outdrive gearcase and bearings in the wheel's hub. In addition, drawing in water and debris often damages the gearcase's and hub's seals. This damage makes it easier for water and debris to enter the gearcase and hub the next time they are submerged.

Thus, there is a need for a device that stabilizes the pressure in the volume of an outdrive gearcase where the unit's gears operate, and in the volume between a wheel's hub and the axle it's mounted to, where the wheel's bearings operate.

SUMMARY

In one aspect of the invention, a device for stabilizing pressure inside a gear's housing or a wheel's hub includes a bladder, and a conduit coupled to the bladder and coupleable to a volume containing a lubricant. The lubricant-containing volume may be the volume inside a housing where a gear is located such as the housing for an upper drive unit of a sterndrive motor. The lubricant-containing volume may also be the volume between a wheel's hub and the axle it's mounted to, where the wheel's bearings operate. The bladder includes a chamber having a volume, and is configured such that the chamber's volume increases as a fluid enters the chamber, and decreases as fluid leaves the chamber. The conduit includes a first end, a second end, and a passage between the first and second ends, and is configured to hold fluid disposed in the passage and direct the fluid between the first and second ends. The first end is positionable adjacent the lubricant-containing volume, and has an opening that exposes the conduit's passage to the lubricant-containing volume to allow fluid in the passage to enter the volume, and allow fluid in the volume to enter the passage. The second end is coupled with the bladder and has an opening that exposes the conduit's passage to the chamber's volume to allow fluid in the passage to enter the chamber's volume, and allow fluid in the chamber's volume to enter the passage. When the conduit is coupled to the lubricant-containing volume, the volume of the bladder's chamber, the passage of the conduit and the lubricant-containing volume are isolated from the ambient environment.

With the volume of the bladder's chamber, the passage of the conduit, and the lubricant-containing volume, isolated from the ambient environment when the device is coupled to a lubricant-containing volume, the mass of the fluid within the device remains constant as the temperature of the fluid changes. And, with the increase or decrease in the volume of the bladder's chamber in response to fluid entering or leaving the volume, respectively, the total volume of the device within which the fluid is held can increase or decrease as needed to keep the fluid pressure inside the lubricant-containing volume substantially constant or stabilized. Thus, the seals that help define the lubricant-containing volume are less likely to be damaged when the lubricant in the lubricant-containing volume is subjected to changes in temperature. This, in turn, helps keep lubricant in the lubricant-containing volume, and helps prevent foreign, unwanted material, such as water and dust outside the lubricant-containing volume.

In another aspect of the invention, a method for stabilizing pressure inside a gear's housing or a wheel's hub includes the following. One, disposing a fluid in both a lubricant-containing volume and a device that is coupled with the lubricant containing volume such that the fluid may move from either to the other, wherein the device includes a bladder and a conduit, the bladder having a chamber that has a volume in which the fluid is disposed, and the conduit having a passage in which the fluid is disposed. Two, isolating the fluid in the lubricant containing volume and device from the ambient environment. Three, allowing fluid disposed in the lubricant-containing volume and device to leave the lubricant-containing volume and enter the volume of the device's chamber, when the fluid pressure in the lubricant containing volume exceeds a first predetermined fluid pressure that is greater than or equal to ambient air pressure. And four, exerting external pressure on the device's bladder to encourage fluid disposed in the device's passage to enter the lubricant-containing volume when the fluid pressure in the lubricant-containing volume drops below a second predetermined fluid pressure that is less than or equal to ambient air pressure.

BRIEF DESCRIPTION OF THE DRAWINGS

Each of FIGS. 1A and 1B shows a view of a device for stabilizing pressure inside a wheel's hub, according to an embodiment of the invention.

DETAILED DESCRIPTION

Figure 1A:
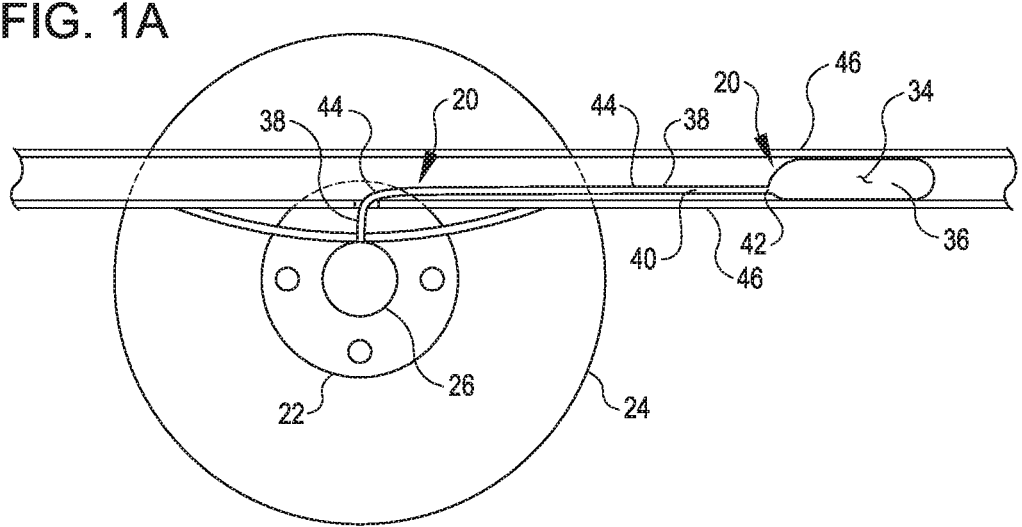
Figure 1B:
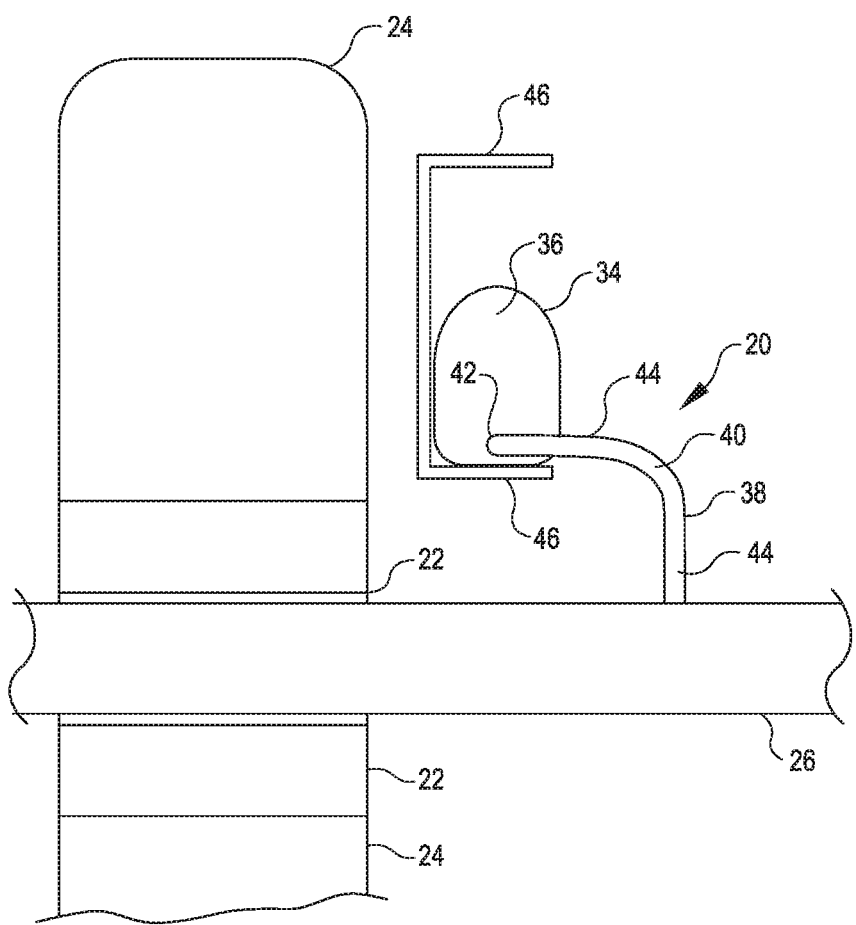

Each of FIGS. 1A and 1B shows a view of a device 20 for stabilizing fluid pressure inside a wheel's hub 22, according to an embodiment of the invention. The device 20 is coupled to the wheel's hub 22 and holds a fluid (here air) isolated from the ambient environment. Although the fluid held in the device 20 is air, the fluid may be any desired fluid such as an inert gas like nitrogen and helium, or a liquid such as oil. Also, although the device 20 is shown coupled to a wheel's hub 22, the device 20 may be coupled to any gearcase whose gears are subjected to changes in temperature and/or pressure, such as a differential in an off-road vehicle that is often submerged in water when crossing a stream or river.

When the hub 22 of the wheel 24 is coupled to an axle 26, two sets of bearings (28 and 30 in FIG. 2) lie between the hub 22 and axle 26 to allow the hub 22, and thus wheel 24, to rotate about the axle 26. These bearings (28 and 30), the axle 26, and the hub 22 define a volume (32 in FIG. 2) that contains a lubricant, such as grease or oil, and often also contains air or some other fluid if the lubricant-containing volume is not completely packed with lubricant. When the lubricant and/or fluid inside the lubricant-containing volume heat up they expand and exert pressure inside the lubricant-containing volume. To keep the fluid pressure inside the hub 22 substantially constant the device 20 allows the air that it holds to leave and enter the lubricant-containing volume, without allowing ambient air to enter the device or allowing the air inside the device to escape. To do this, the device 20 includes a bladder 34 that has a chamber 36 whose volume can increase and decrease as air enters and leaves, respectively, the chamber's volume. The device 20 also includes a conduit 38, a portion of which is shown in FIGS. 1A and 1B with the remaining portion shown in FIG. 2, that has a passage 40 that also holds the air. The conduit 38 includes a first end (FIG. 2) that has an opening exposed to the lubricant-containing volume, and a second end 42 that has an opening exposed to the volume of the bladder's chamber 36.

With the volume of the bladder's chamber 36, the passage 40 of the conduit 38, and the lubricant-containing volume (32 in FIG. 2), isolated from the ambient environment when the device 20 is coupled to a lubricant-containing volume, the mass of the air within the device 20 remains constant as the temperature of the lubricant in the lubricant-containing volume changes. And, with the increase or decrease in the volume of the bladder's chamber 36 in response to air entering or leaving the volume, respectively, the total volume of the device 20 within which the air is held can increase or decrease as needed to keep the fluid pressure inside the lubricant-containing volume substantially constant or stabilized. Thus, seals that help protect the bearings (28 and 30 in FIG. 2) are less likely to be damaged when the lubricant in the lubricant-containing volume is subjected to changes in temperature. This, in turn, helps keep lubricant inside the lubricant-containing volume, and helps prevent foreign, unwanted material, such as water and dust outside the lubricant-containing volume from entering the lubricant-containing volume.

The fluid pressure inside the lubricant-containing volume that the device 20 keeps substantially constant or stabilizes may be any desired fluid pressure that the seals of the wheel's hub are designed to function best with. For example, in this and other embodiments the fluid pressure inside the lubricant-containing volume of the wheel's hub 22 may be equal to the air pressure in the ambient environment. In such embodiments, the bladder 34 (discussed in greater detail in conjunction with FIG. 3) may be configured to expand and contract in response to the pressure of the air inside the conduit's passage 40 exceeding or falling below, respectively, the ambient air pressure. The pressure of the air inside the conduit 38 can exceed ambient air pressure when the fluid pressure inside the lubricant-containing volume increases and urges fluid and/or lubricant out of the lubricant-containing volume and toward the conduit's passage 40. The pressure of the air inside the conduit's passage 40 can fall below ambient air pressure when the fluid pressure inside the lubricant-containing volume decreases and urges fluid and/or lubricant into the lubricant-containing volume and away from the conduit's passage 40.

In other embodiments, the bladder 34 may be configured to expand and contract in response to the pressure of the air inside the conduit's passage exceeding or falling below a predetermined pressure that is greater than ambient air pressure. To do this the bladder 34 may be made of material that requires more force to elastically deform it, than the force required to elastically deform the bladder 34 mentioned in the previous paragraph. In other words, a material that acts like a spring that is stiffer than the spring action of the bladder mentioned in the previous paragraph. In still other embodiments, the bladder 34 may be configured to expand and contract in response to the pressure of the air inside the conduit's passage exceeding or falling below a predetermined pressure that is less than ambient air pressure. To do this the device 20 may be charged with a mass of air that is insufficient for the combined volume of the bladder's chamber 36, the conduit's passage 40, and the lubricant-containing volume, to generate enough pressure to equal the ambient air pressure. In this situation, the bladder 34 may again be made of material that requires more force to elastically deform it than the force required to elastically deform the bladder 34 mentioned in the previous paragraph. This is needed so that the low air pressure in the device 20 does not cause the combined volume of the bladder's chamber 36, the conduit's passage 40, and the lubricant-containing volume, to shrink and thus increase the air pressure in the device 20.

Still referring to FIGS. 1A and 1B, the device 20 may be mounted to the wheel's hub 22 in any desired manner. For example, in this and other embodiments the conduit 38 includes a first portion (discussed in greater detail in conjunction with FIG. 2) that includes a bore in the axle 26, and a second portion 44 that couples the first portion with the bladder 34. The first portion is configured such that it's opening lies adjacent the lubricant-containing volume and exposes the lubricant-containing volume to the passage of the conduit's first portion. The second portion 44 is coupled to the first portion via a nipple (FIG. 2) and a hose clamp (not shown), and to the bladder 34 via a hose clamp (also not shown). To keep the conduit's second portion 44 and the bladder 34 adjacent the wheel's hub 22, the second portion 44 and the bladder 34 are releasably fastened to a rail 46 of a trailer's frame with cable ties (not shown). In addition, the bladder 34 is located at the rear of the trailer's rail 46 so that when one launches the boat that the trailer carries, the bladder 34 will be submerged under water. When submerged, the water exerts an additional force on the bladder 34 that urges the bladder 34 to contract, and thus increase the fluid pressure inside the lubricant-containing volume at a time when the additional boost may be helpful—that is, when the wheel's hub 22 is submerged in water that is colder than the lubricant in the lubricant-containing volume.

In other embodiments, the bladder 34 may be located on a region of the trailer's rail 46 that does not submerge when one launches the boat carried by the trailer. In such embodiments, the device 20 would still increase the pressure inside the lubricant-containing volume in response to the pressure inside the lubricant-containing volume falling below a predetermined pressure.

Figure 2:
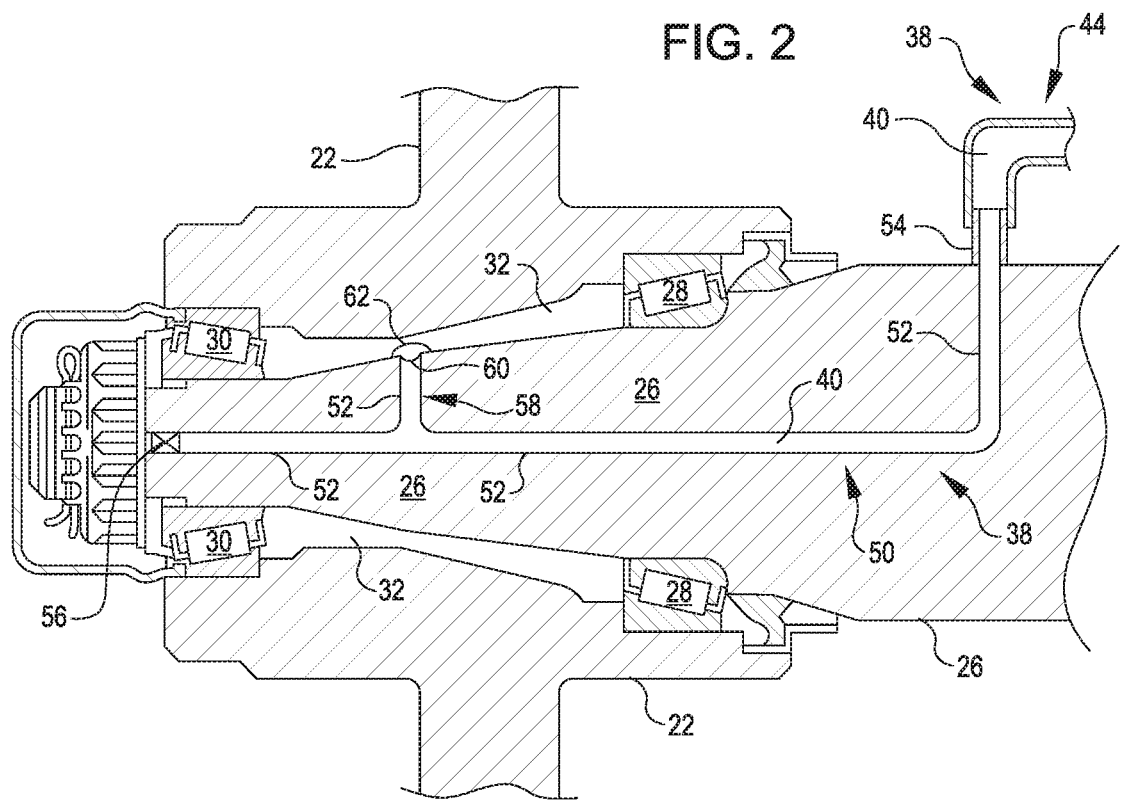
FIG. 2 shows a cross-sectional view of a portion of the device shown in FIGS. 1A and 1B, according to an embodiment of the invention.

FIG. 2 shows a cross-sectional view of the first portion 50 of the device's conduit 38 shown in FIGS. 1A and 1B, according to an embodiment of the invention. The first portion 50 of the conduit 38 joins the lubricant-containing volume 32 with the passage 40 of the second portion 44 of the conduit 38 so that the conduit 38 can join the lubricant-containing volume 32 with the volume of the bladder's chamber 36 (FIGS. 1A and 1B).

The first portion 50 of the conduit 38 may be configured as desired. For example, in this and other embodiments, the first portion 50 includes a bore 52 in the axle 26, a nipple 54 to couple the first portion 50 with the conduit's second portion 44, and a plug 56 to help seal the passage 40 of the first portion 50 from the ambient environment. The bore 52 includes the conduit's first end 58 whose opening 60 exposes the lubricant-containing volume 32 to the passage 40 of the conduit 38. The size of the opening 60 and the bore 52 may be any desired size. For example, here, the size of the opening 60 and the bore 52 are the same at 0.2 inches is diameter. To help prevent lubricant from moving through the opening 60 when the lubricant heats up, a slinger 62 is disposed in the lubricant-containing volume 32. The slinger 62 functions much like a wind shield on a motorcycle and is mounted to the axle 26 adjacent and ahead of the opening 60 in the direction opposite the direction that the wheel's hub 22 rotates when the trailer travels forward. In this manner, as the wheel's hub rotates any lubricant that would normally pass over the opening 60 is pushed aside by the slinger 62.

Other embodiments are possible. For example, the size of the opening 60 may be smaller than the size of the bore 62. This may be desirable to help prevent lubricant from leaving the lubricant-containing volume 32 when the pressure inside the lubricant-containing volume increases. For another example, the opening 60 may be located at the bottom of the axle 26 so that gravity can help keep lubricant from moving through the opening 60. For yet another example, the slinger 62 may be omitted if the density of the lubricant and the pressures inside the lubricant-containing volume 32 do not permit the lubricant to move through the opening 60. In addition, the first portion 50 of the conduit may not include a bore 52 through the axle 26, but instead, may include a bore through the wheel's hub 22, or a passage through one or both sets of the bearings 28 and 30.

Figure 3:
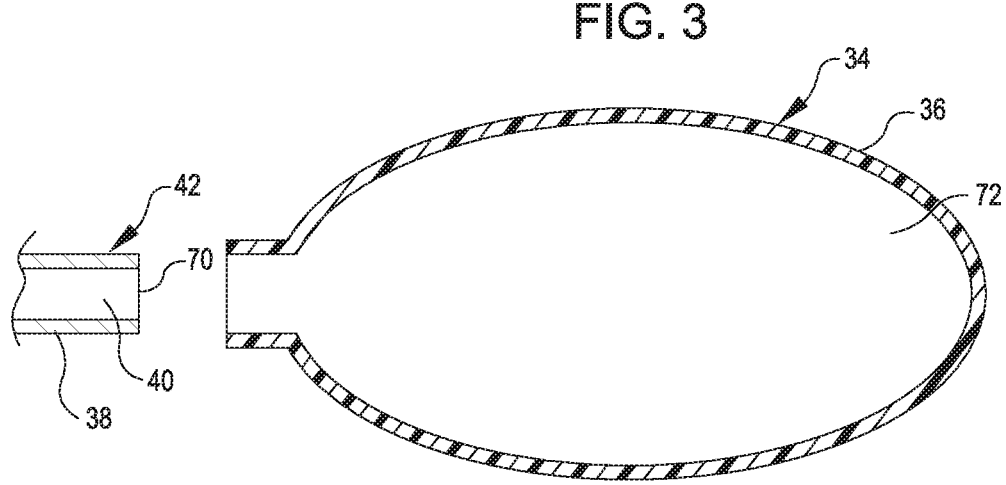
FIG. 3 shows a cross-sectional view of another portion of the device shown in FIGS. 1A and 1B, according to an embodiment of the invention.

In operation, as the bearings 28 and 30 in the wheel's hub 22 rotate and revolve relative to the axle 26 and the hub 22 they heat up. The heat that they generate is conveyed to the lubricant and any other fluid in the lubricant-containing volume 32. This causes the lubricant and the fluid to expand. As these expand, they generate pressure in the air and other fluid at the opening 60 and urge the air and fluid in the passage 40 of the bore 52 to move away from the lubricant-containing volume 32 and toward the second portion 44 of the conduit 38. This, in turn, causes the air pressure in the passage 40 of the second portion 44 to increase, which then causes the air in the passage 40 at the opening (FIG. 3) of the second end 42 (FIGS. 1A, 1B and 3) to leave the passage 40 and enter the volume of the bladder's chamber 36 (FIGS. 1A, 1B and 3). To accommodate the increase in the amount of air in the bladder's chamber 36 the bladder 34 (FIGS. 1A, 1B and 3) expands, thus reducing the air pressure throughout the device 20, and the pressure inside the lubricant-containing volume 32.

Similarly, when the wheel's bearing 28 and 30 are submerged in water the lubricant and any other fluid in the lubricant-containing volume 32 cools. This causes the lubricant and fluid to contract. As these contract, they lower the pressure in the air and other fluid at the opening 60 and urge the air and fluid in the passage 40 of the bore 52 to move toward the lubricant-containing volume 32 and away from the second portion 44 of the conduit 38. This, in turn, causes the air pressure in the passage 40 of the second portion 44 to decrease, which then causes the air in the passage 40 at the opening (FIG. 3) of the second end 42 (FIGS. 1A, 1B and 3) to move toward the first portion 50 of the conduit 38 and leave the volume of the bladder's chamber 36 (FIGS. 1A, 1B and 3). To accommodate the decrease in the amount of air in the bladder's chamber 36 the bladder 34 (FIGS. 1A, 1B and 3) contracts, thus increasing the air pressure throughout the device 20, and the pressure inside the lubricant-containing volume 32.

FIG. 3 shows a cross-sectional view of the bladder 34 and a section of the second portion 44 shown in FIGS. 1A and 1B, according to an embodiment of the invention. The second portion 44 of the conduit 38 includes the conduit's second end 42 that has an opening 70 that exposes the passage 40 to the volume 72 of the bladder's chamber 36 and is releasably coupled to the bladder 34 via a hose clamp (not shown).

The second portion 44 of the conduit 38 and the bladder 34 may be configured as desired. For example, in this and other embodiments the bladder includes a material that is very elastic, and the second portion 44 of the conduit 38 includes a material that is flexible but not as elastic as the bladder's material. More specifically, the bladder 34 includes a rubber material that forms the chamber 36 and has a Young's modulus equal to or less than $1.450 \times 10^{-3}$ pound-force per square inch; and the second portion 44 of the conduit 38 includes a plastic material, such as Polyethylene Terephthalate (PET), that forms the passage 40 and has a Young's modulus of about 0.29 pound-force per square inch. The chamber 36 is in the shape of a balloon, forms the whole shape of the bladder 34, and increases its volume 72 by 1 cubic centimeter ($cm^3$) when 1.1 $cm^3$ of air enter the volume 72. This allows the device 20 to closely maintain a substantially constant pressure inside the lubricant-containing volume 32. In other embodiments, the volume 72 of chamber 36 may increase its volume 72 by 0.75 cm³ when 1.2 cm³ of air enters its volume 72. This would permit the device 20 to allow a slight increase in pressure inside the lubricant-containing volume 32 when the hub 2 is warm, and, if the initial pressure is greater than ambient pressure, then this would also allow the device 20 to increase the pressure inside the lubricant-containing volume 32 to above ambient pressure when the bladder 28 and hub 14 are submerged in cold water.

As previously mentioned the bladder 34 may be configured as desired to respond to changes in any desired predetermined pressure inside the lubricant-containing volume 32. This can be done by configuring the shape of the chamber 36 so that a portion or all of the chamber expands and contracts in response to a change in the pressure, or by including a material having a different Young's modulus.

Other embodiments are possible. For example, the second portion 44 may also include material that has a Young's modulus of $1.450 \times 10^{-3}$ pound-force per square inch or is very elastic. In this manner the second portion 44 helps the bladder 34 absorb and generate pressure inside the device 20 to stabilize or keep substantially constant the pressure inside the lubricant-containing volume (32 in FIG. 2). For another example, the bladder 34 may include a desiccant to remove moisture from the air contained in the device 20.

Figure 4:
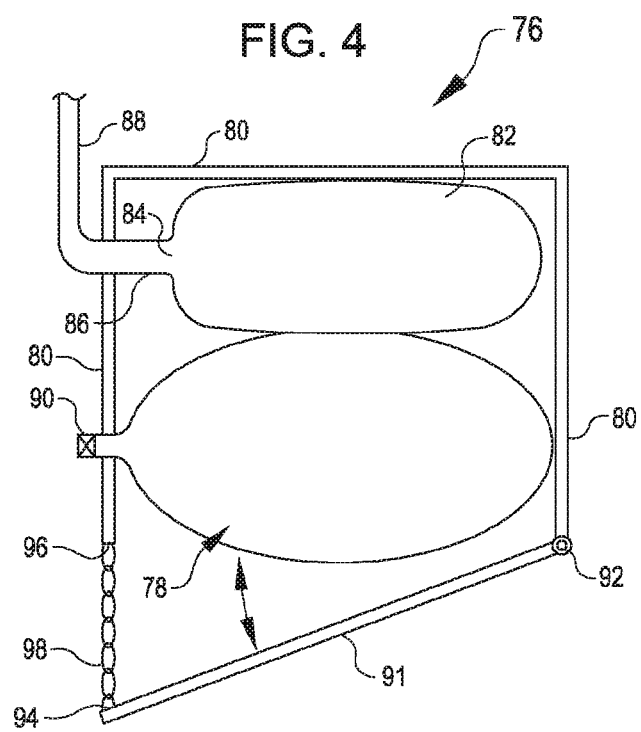
FIG. 4 shows a view of a portion of a device for stabilizing pressure inside a wheel's hub, according to another embodiment of the invention.

FIG. 4 shows a view of a portion of a device 76 for stabilizing pressure inside a wheel's hub, according to another embodiment of the invention. The device 76 is similar to the device 20 discussed in conjunction with FIGS. 1A-3 except that the device 76 includes a second bladder 78 located within a housing 80 to help urge fluid within the bladder 82 toward the lubricant-containing volume within the hub to keep the lubricant-containing volume pressurized.

In this and other embodiments, the second bladder 78 includes a chamber 84 containing any desired fluid that is less dense than water (here air). When the housing 80 is submerged in water, the buoyancy of the second bladder 78 urges the second bladder 78 against the bladder 82. Because the bladder 82 is confined by the top of the housing 80, the second bladder 78 pinches the bladder 82 against the housing's top causing fluid inside the bladder 82 to move into the opening 84 of the second end 86 of the conduit 88 and toward the lubricant-containing volume. To control the amount force that the second bladder 78 exerts on the bladder 82, air or another gas may be injected into or released from the second bladder's chamber 84 through the valve 90. The bottom 91 of the housing 80 may be pivoted at the leading edge 92 to an open position (shown) to allow water to flow into the housing 80 when the housing 80 is being submerged, and to a closed position to protect the second bladder 78 and bladder 82 during travel. The closed position occurs when the trailing edge 94 contacts the edge 96. The chain 98 may be used to hold the bottom 91 of the housing 80 in either or both of the closed and open positions.

Figure 5:
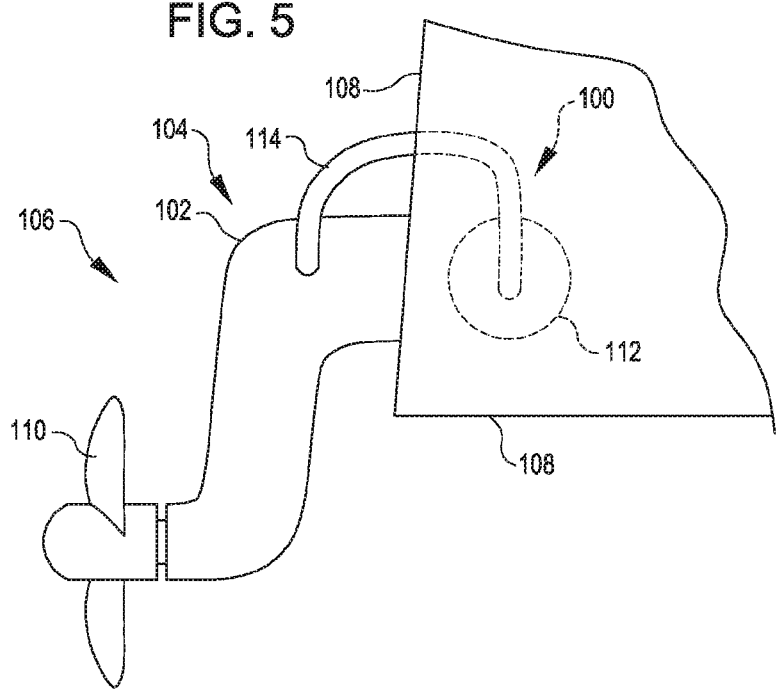
FIG. 5 shows a device for stabilizing pressure inside a gear housing, according to yet another embodiment of the invention.

FIG. 5 shows a device 100 for stabilizing pressure inside a sealed gear housing 102 of an outdrive gearcase 104 of a stern-drive motor 106 for a boat 108, according to yet another embodiment of the invention. The device 100 is similar to the device 20 discussed in conjunction with FIGS. 1A-3.

In this and other embodiments, the device 100 is coupled to the outdrive gearcase 102 that houses a series of gears that transmits the rotation of the engine's crank shaft (typically located inside the boat, unless the motor is an outboard motor) to the propeller 110 located in the water. The device 100 includes a bladder 112 located inside the boat 108, and tubing 114 that fluidly and sealingly couples the bladder 112 to the inside of the housing 102 in which a lubricant-containing volume contains gear oil and the gears. When the motor 106 rotates the propeller 110 to move the boat 108 on water, the gears vigorously mix the gear oil with air trapped inside the housing 102, and heat the gear oil. The vigorous mixing of the gear oil causes the gear oil to become frothy which significantly reduces the gear oil's ability to adequately lubricate the gears. And, as the temperature inside the lubricant-containing volume increases, the air pressure inside the lubricant-containing volume increases. To reduce this increase in pressure inside the lubricant-containing volume and to allow the frothy gear oil to leave the gears, the tubing provides a sealed passage from the housing 102 to the bladder 112 for the frothy oil and hot air to escape from the lubricant-containing volume. Inside the bladder 112 the frothy oil is allowed to sit while the air and oil separate out from each other. Then, as the temperature of the gear oil and air inside the lubricant-containing volume cools, the froth-less oil is urged back into the lubricant-containing volume inside the housing 102 to lubricate the gears.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A device for stabilizing pressure inside a gear's housing or a wheel's hub, the device comprising:
    a bladder including a chamber having a volume, the bladder configured such that the chamber's volume increases as a fluid enters the chamber and decreases as fluid leaves the chamber;
    a conduit having a first end, a second end, and a passage between the first and second ends, the conduit configured to hold fluid disposed in the passage and direct the fluid between the first and second ends, wherein:
        the first end has an opening that allows fluid in the passage to leave the passage, the first end being positionable adjacent a volume containing a lubricant, such that the opening exposes the conduit's passage to the volume containing lubricant to allow fluid in the passage to enter the volume, and allow fluid in the volume to enter the passage, and
        the second end has an opening that allows fluid in the passage to leave the passage, the second end coupled with the bladder such that the second end's opening exposes the conduit's passage to the chamber's volume to allow fluid in the passage to enter the chamber's volume, and allow fluid in the chamber's volume to enter the passage;
    wherein when the conduit's first end is positioned adjacent a volume containing lubricant, then the volume of the bladder's chamber, the passage of the conduit and the volume containing lubricant are isolated from the ambient environment.

2. The device of claim 1 wherein the bladder includes an elastic material having a Young's modulus equal to or less than 0.001450 pound-force per square inch.

3. The device of claim 1 wherein the fluid includes air.

4. The device of claim 1 wherein the fluid includes oil.

5. The device of claim 1 wherein the conduit's passage includes a bore in a portion of an axle that is configured to carry a wheel's hub, wherein the opening of the conduit's first end exposes the bore to the volume containing lubricant.

6. The device of claim 1 wherein the conduit's passage includes a bore in a portion of an axle that is configured to carry a wheel's hub, wherein the opening of the conduit's first end exposes the bore to the volume containing lubricant, and the opening of the conduit's second end exposes the bore to the chamber's volume.

7. The device of claim 1 wherein the conduit's passage includes a flexible tube that is coupled to the bladder and defines a portion of the conduit's passage, wherein the opening of the conduit's second end exposes the portion of the passage defined by the flexible tube to the volume of the bladder's chamber.

8. The device of claim 1 further comprising a second bladder located adjacent the bladder coupled with the conduit and operable to exert pressure against the bladder coupled with the conduit to urge fluid in the bladder's chamber to enter the conduit's passage.

9. The device of claim 8 wherein the second bladder is located below the bladder coupled with the conduit and holds a fluid having a density that is less than the density of water such that when the second bladder is submerged in water the second bladder's buoyancy causes the second bladder to exert pressure against the bladder coupled with the conduit.

10. The device of claim 8 wherein the second bladder includes a valve operable to allow a fluid to enter the bladder and to prevent a fluid from leaving and entering the bladder.

11. The device of claim 1 wherein the volume containing lubricant includes the volume of space that lies between a wheel's hub, a portion of an axle that the wheel's hub is mounted on, and two sets of bearings disposed between the wheel's hub and axle's portion.

12. The device of claim 1 wherein the lubricant containing volume includes the volume of space that lies between a gear train of a boat's motor and the housing that surrounds the gear train.

13. A trailer for towing a boat, the trailer comprising:
a wheel having a hub that is mounted to an axle wherein a bearing lies between the axle and the wheel's hub to allow the wheel to rotate about the axle and a volume defined by the space between the axle and the wheel's hub contains a lubricant for the bearing; and
a device for stabilizing pressure inside the volume containing lubricant, the device comprising:
a bladder including a chamber having a volume, the bladder configured such that the chamber's volume increases as a fluid enters the chamber and decreases as fluid leaves the chamber;
a conduit having a first end, a second end, and a passage between the first and second ends, the conduit configured to hold fluid disposed in the passage and direct the fluid between the first and second ends, wherein:
the first end has an opening that allows fluid in the passage to leave the passage, the first end positioned adjacent the volume containing lubricant, such that the opening exposes the conduit's passage to the volume containing lubricant to allow fluid in the passage to enter the volume, and allow fluid in the volume to enter the passage, and
the second end has an opening that allows fluid in the passage to leave the passage, the second end coupled with the bladder such that the second end's opening exposes the conduit's passage to the chamber's volume to allow fluid in the passage to enter the chamber's volume, and allow fluid in the chamber's volume to enter the passage;
wherein the volume of the bladder's chamber, the passage of the conduit and the volume containing lubricant are isolated from the ambient environment.

14. A motor for propelling a boat in water, the motor comprising:
a gear for transmitting power from an engine of the motor to a propeller;
a housing having a volume inside which the gear and a lubricant for the gear are disposed; and
a device for stabilizing pressure inside the volume containing lubricant, the device comprising:
a bladder including a chamber having a volume, the bladder configured such that the chamber's volume increases as a fluid enters the chamber and decreases as fluid leaves the chamber;
a conduit having a first end, a second end, and a passage between the first and second ends, the conduit configured to hold fluid disposed in the passage and direct the fluid between the first and second ends, wherein:
the first end has an opening that allows fluid in the passage to leave the passage, the first end positioned adjacent the volume containing lubricant, such that the opening exposes the conduit's passage to the volume containing lubricant to allow fluid in the passage to enter the volume, and allow fluid in the volume to enter the passage, and
the second end has an opening that allows fluid in the passage to leave the passage, the second end coupled with the bladder such that the second end's opening exposes the conduit's passage to the chamber's volume to allow fluid in the passage to enter the chamber's volume, and allow fluid in the chamber's volume to enter the passage;
wherein the volume of the bladder's chamber, the passage of the conduit and the volume containing lubricant are isolated from the ambient environment.

15. A method for stabilizing pressure inside a gear's housing or a wheel's hub, the method comprising:
disposing a fluid in both a lubricant containing volume and a device that is coupled with the lubricant containing volume such that the fluid may move from either to the other, wherein the device includes a bladder and a conduit, the bladder having a chamber that has a volume in which the fluid is disposed, and the conduit having a passage in which the fluid is disposed;
isolating the fluid in the lubricant containing volume and device from the ambient environment;
allowing fluid disposed in the lubricant containing volume and device to leave the lubricant containing volume and enter the volume of the device's chamber, when the fluid pressure in the lubricant containing volume exceeds a first predetermined fluid pressure that is greater than or equal to ambient air pressure; and
exerting external pressure on the device's bladder to encourage fluid disposed in the device's passage to enter the lubricant containing volume when the fluid pressure in the lubricant containing volume drops below a second predetermined fluid pressure that is less than or equal to ambient air pressure.

16. The method of claim 15 wherein the fluid disposed in the lubricant containing volume and the device includes air.

17. The method of claim 15 wherein the fluid disposed in the lubricant containing volume and the device includes oil.

18. The method of claim 15 wherein the lubricant containing volume includes the volume of space that lies between a wheel's hub, a portion of an axle that the wheel is mounted on, and two sets of wheel bearings disposed between the wheel's hub and axle's portion.

19. The method of claim 15 wherein the lubricant containing volume includes the volume of space that lies between a gear train of a boat's motor and the housing that surrounds the gear train.

20. The method of claim 15 wherein exerting external pressure includes submerging the bladder in water.

21. The method of claim 15 wherein exerting external pressure on the device's bladder includes a second bladder pinching the device's bladder against a housing.

22. The method of claim 21 wherein exerting external pressure on the device's bladder includes submerging the second bladder in water, wherein the second bladder contains a fixed amount of fluid whose density is less than water.

23. The method of claim 15 further comprising exerting external pressure on the device's bladder to encourage fluid disposed in the device's passage to enter the lubricant containing volume when the fluid pressure in the lubricant containing volume drops below a third predetermined fluid pressure that is greater than ambient air pressure.

* * * * *